(12) United States Patent
Veerina et al.

(10) Patent No.: US 6,243,379 B1
(45) Date of Patent: *Jun. 5, 2001

(54) CONNECTION AND PACKET LEVEL MULTIPLEXING BETWEEN NETWORK LINKS

(75) Inventors: Mahesh Veerina; Suresh Gurajapu, both of Sunnyvale; Raghu Bathina, Newark, all of CA (US)

(73) Assignee: Ramp Networks, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/835,072

(22) Filed: Apr. 4, 1997

(51) Int. Cl.[7] .................................................. H04L 12/28
(52) U.S. Cl. ............................................. 370/389; 370/401
(58) Field of Search .................................. 370/400, 389, 370/401, 402, 404, 406, 408, 410; 395/200.3, 200, 200.79

(56) References Cited

U.S. PATENT DOCUMENTS 5,790,548 * 8/1998 Sistanizadeh et al. ............... 370/401
5,793,763 * 8/1998 Mayes et al. ......................... 370/389
5,806,044 * 9/1998 Powell ................................... 705/14

* cited by examiner

Primary Examiner—Valencia Martin-Wallace
Assistant Examiner—Kim T. Nguyen
(74) Attorney, Agent, or Firm—Fernandez & Associates, LLP

(57) ABSTRACT

Router circuit, provides Internet protocol (IP) address translation to enable connection or packet-level multiplexing over multiple single-user IP address account links. Connection-level multiplexing (CLM) provide between LAN and WAN addresses outbound packet transfer by replacing private packet source IP address and port number with said external IP address port number, and inbound packet transfer by replacing external packet destination IP address and port number with private IP address and port number. Look-up table provides bi-directional translation or effective multiplexing of IP addresses and port assignments for incoming or outgoing packets. Packet-level multiplexing (PLM) provides between LAN1 and LAN2 addresses outbound packet processing, wherein destination IP address and port number are replaced with external IP address and port number, and inbound packet processing, wherein source IP address and port number are replaced with internal IP address and port number. Link or port allocation are optimizable according to round-robin or bandwidth loading algorithm.

14 Claims, 9 Drawing Sheets

| Source IP Address and port No. | Valid IP address and port No. | | Destination IP address and port No. | |
|---|---|---|---|---|
| LAN PC 1 IP — PC Port 1025 | WAN 1 IP | WAN 1 Port 4000 | Dest IP 1 | HTTP Server |
| LAN PC 2 IP — PC Port 1025 | WAN 2 IP | WAN 1 Port 4000 | Dest IP 2 | HTTP Server |
| LAN PC 1 IP — PC Port 1026 | WAN 1 IP | WAN 1 Port 4001 | Dest IP 3 | FTP Server |
| LAN PC 2 IP — PC Port 1026 | WAN 3 IP | WAN 1 Port 4003 | Dest IP 2 | HTTP Server |

FIG. 2

CONNECTION AND PACKET LEVEL MULTIPLEXING BETWEEN NETWORK LINKS

BACKGROUND OF THE INVENTION

1. Field of the Invention

The invention relates to electronic communication, particularly to multiplex techniques for connecting multiple links between networked computers for digital packet transfer.

2. Description of Background Art

With the explosive growth of electronic networks and data communications, there has been increased need for improved ways for interconnecting computers, particularly as configured in local-area networks (LAN), wide-area networks (WAN), and other network configurations. Conventional networking equipment, such as routers and modems, provide connections for exchanging data between computers; however, current connection capacity and performance are limited.

Moreover, various Internet Service Providers (ISP) offer users individual or corporate accounts through which users may communicate with others across the Internet, for example, by sending and receiving electronic mail messages as well as setting-up and accessing world-wide web sites. Typically, a user installs modem equipment to connect his or her personal computer through a telephone line by dialing a local phone number to access an Internet account maintained by an ISP on its server. The ISP server is then connected directly to the wide-area networks which are collectively interconnected and known generally as the Internet.

Although ISP servers are configured currently to provide single-user accounts, each having a single Internet Protocol (IP) address wherein such accounts are extendible via known techniques such as address translation to support multiple users, conventional use of such single-user account is insufficient for satisfying the increased bandwidth requirements of multiple users. There is a need, therefore, to provide an improved methodology and system for connecting users seamlessly to the Internet through multiple single-user ISP accounts.

SUMMARY OF THE INVENTION

The invention resides in digital communications equipment configured with an Internet Protocol (IP) routing facility which couples one or more processors in a network to one or more processors in another network for electronic packet transfer over multiple links therebetween selectively according to multiple single-user IP account addressing schemes. In particular, limited resource allocation is accomplished by multiplexing network links through a programmable reference scheme, such as a software or firmware look-up table or another associative data structure implemented in computer storage, which provides bi-directional, inbound-outbound translation and assignment of IP addresses and port assignments for packet transfer selectively over available links.

Connection or packet-level multiplexing for sending packets through certain network links, for example, corresponding to multiple single-user ISP accounts, is enabled effectively by modifying or replacing packet address and port assignment while routing data between internal and external computer networks preferably according to multiplexed connections programmed in look-up table.

Connection-level multiplexing (CLM) provides packet transfer through multiple single-user IP address accounts between multiple users in a Local-Area Network (LAN) and multiple destinations or host processors in a Wide-Area Network (WAN). In particular, during outbound LAN-WAN packet processing, source IP address and port number of outgoing packet are replaced with valid IP address and port number. Moreover, during inbound WAN-LAN packet processing, destination IP address and port number of incoming packet are replaced with internal IP address and port number.

Packet-level multiplexing (PLM), which is similar to CLM in an analogous but functionally reverse manner, provides packet transfer through multiple single-user IP address accounts between individual users in different public or private LAN clusters, which may also be connected to other WAN users. In particular, during outbound LAN1-LAN2 packet processing, destination IP address and port number of outgoing packet are replaced with external IP address and port number. Moreover, during inbound LAN2-LAN1 packet processing, source IP address and port number of incoming packet are replaced with internal IP address and port number.

Preferably, during packet processing according to CLM or PLM as described herein, route link establishment and packet address replacement are performed by maintaining, checking, and updating entries in look-up table in memory. Furthermore, network resource assignment, such as WAN-LAN or LANA-LANB link selections, may be optimized according to round-robin, bandwidth loading, or other resource-sharing criteria.

BRIEF DESCRIPTION OF THE DRAWINGS

FIG. 2 is a sample look-up chart showing representative table entries for IP address and port translation according to the present invention.

DETAILED DESCRIPTION OF THE PREFERRED EMBODIMENT

Figure 1:
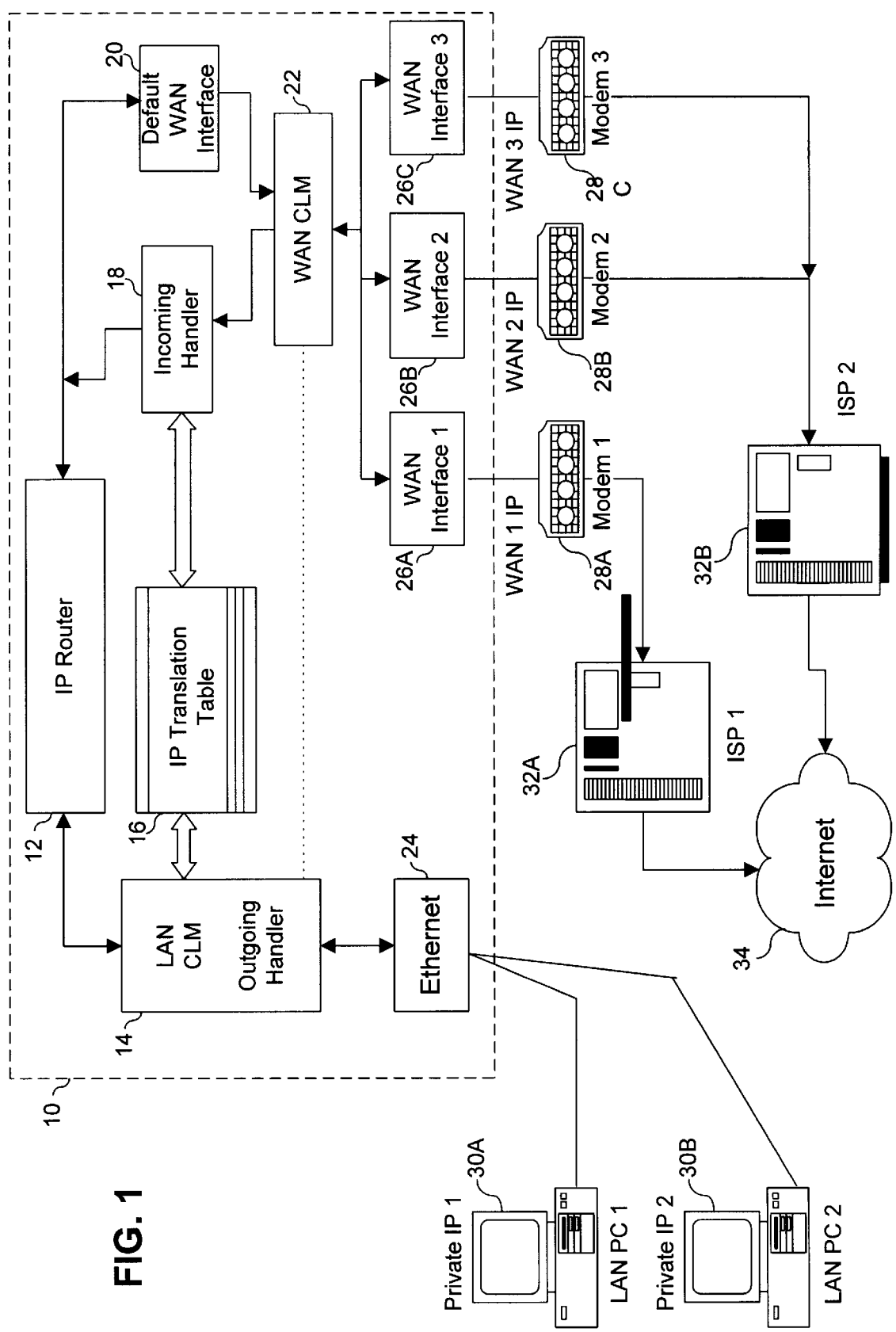
FIG. 1 is a top-level block diagram of a representative system having WAN-LAN interconnection for implementing the present invention.

FIG. 1 is a schematic diagram showing multiplexed network connection facility or functional circuit module 10 for selectably routing digital packets transferred between local area network (LAN) including one or more processors or computers 30A, 30B coupled via Ethernet interface 24 or equivalent circuit functionality which is capable of sending and receiving Ethernet or similar packets, and generally wide area network (WAN) to conventional Internet 34 through host servers or processors 32A, 32B for Internet Service Providers (ISP) coupled over multiple WAN links or equivalent network connections through modems 28A, 28B, 28C or similar remote access devices via WAN interfaces 26A, 26B, 26C. LAN PCs 30 may be any computer or processor which is connectable conventionally to a local network, e.g., equipped with TCP/IP software and Ethernet interface card.

Connection facility 10 includes Internet Protocol (IP) router 12 or other equivalent packet transfer mechanism, which receives incoming and outgoing packets for bidirectional routing between LAN and WAN addresses accessible conventionally across the Internet. IP router 12 supports standard TCP/IP routing, and has a LAN interface as well as a single WAN interface, although multiple WAN links may be provided, and one (e.g., the first provided) WAN link is recognized as a single available WAN link. Preferably, such WAN interface serves as default route apparently for packet routing.

As shown, Ethernet interface 24 couples PCs 30A, 30B to LAN Connection-Level Multiplexing (CLM) and outgoing handler functional module 14. When operating, CLM outgoing handler 14 receives outgoing packets from Ethernet interface 24 and transfers such packets for further processing. Ethernet frame information is removed by interface 24. Outgoing handler 14 checks IP translation table 16 to look-up and determine whether outgoing packets are included therein. If outgoing packets are not found in IP translation table 16 (i.e., outgoing packet connection is new), then a new entry is created and added to table 16 or other similar associative data structure by LAN CLM functional module.

Once such entry representing outbound packet connection exists in table 16, the outgoing packet address and port designations are translated or equivalently modified as described herein and sent to IP router 12. Outbound translation process provides effective channel multiplexing or resource sharing by allocating available single-user links and, in particular, involves changing source IP address and source port number to match an external IP address and port number.

For packets belonging to new connections (i.e., without table entry), LAN CLM functional module 14 maps such packets to external WAN links, preferably through default or certain allocation criteria link assignments. Sharing or designation algorithm may be used to decide on which link the outgoing packet shall go out. The link-selection algorithm may be simple "round robin" scheme, wherein next available resource is allocated in sequence, or more complex load-balancing or dynamically-adaptive resource or performance optimization scheme that takes into account information such as the speed of available links, number of connections already existing on the links, historical performance, behavior pattern or anticipated capacity of particular channels or users, or type of actual connections being serviced currently by various links in order to prioritize or map allocation of available network channel resources to computer users.

For example, lower-billing rate WAN links may be assigned earlier to reduce usage cost, higher bandwidth or data rate channels may be reserved to priority users, recently unreliable or drop-prone links are avoided, similar performance characteristic (e.g., data rate, bandwidth, distance delay, etc.) links are grouped together for related application or user, predicted or user-indicated future demand on certain links is reserved during upcoming time slots, etc.

Once the selection decision has been made (i.e., to map outgoing packet through particular external WAN link), an entry is created or activated in the IP translation table, and outgoing handler translates and forwards such packet and connection information to IP router 12. Router 12 sends data to outgoing handler when router 12 has packet that is destined for a non-local network.

WAN interfaces 26A, 26B, 26C provide standard network remote access porting circuitry for coupling multiple WAN links or equivalent physical connections over conventional modems 28A, 28B, 28C or similar remote access devices provided externally, internally or otherwise integrated physically to WAN connection-level multiplexing (CLM) module 22. Preferably, LAN CLM 14 and WAN CLM 22 exchange information about existing link loads and current connect speeds in order to provide appropriate resource allocation and particular incoming or outgoing link selection according to multiplex algorithm specified herein. WAN CLM module 22 couples to incoming handler 18 and default WAN interface 20 which then couples to IP router 12. Incoming packets are preferably not processed by WAN CLM 22, but passed unaltered to incoming handler 18 for address translation.

Incoming handler 18 checks IP translation table 16 to look-up or determine whether incoming packets are already indicated to be included therein. If so determined that current incoming packet is not found in table 16, then such packet is dropped. But if it is determined that incoming packet exists in table 16, then address and port designations for such incoming packet are translated and sent to IP router 12. Incoming translation process similarly to outgoing process provides effective channel multiplexing or resource sharing by selecting available single-user links and, in particular, involves changing the destination IP address and destination port number of the incoming packet to match an internal IP address and port number. However, unlike outgoing packet processing, incoming packet processing essentially does not depend on identifying which particular WAN link the incoming packet came in on.

Default WAN interface 20 provides determination of initial, default WAN link to the router. This interface also serves preferably as apparently sole default route for router; and outgoing packets are sent through this interface. IP router 12 sends to default WAN interface 20 outgoing packet when IP router 12 detects a destination IP address for which IP router 12 does not have an existing routing, e.g., such would be the case for all outgoing packets destined for conventional external Internet addresses. All outgoing packets are forwarded from default WAN interface 20 to WAN CLM 22, without substantial processing. Hence, based on specified source IP address of outgoing packet, WAN CLM 22 forwards such packet to certain WAN interface 26.

When outbound packets are sent through single default WAN link, external address interfacing may be substantially simplified, and possibly made more economical, as multiple users share or multiplex a common ISP IP user account. This advantage may arise, for example, when multiple users share a typically single-user, flat-fee, relatively unlimited-use ISP account.

In accordance with an important aspect of the present invention, IP translation table 16 or functionally equivalent reference scheme is provided between outgoing handler 14 and incoming handler 18. Table 16 may be one or more modifiable look-up table or associative data structure implemented preferably in software, as shown with representative connection entries in FIG. 2. Table 16 includes referenceable indications of source IP address and port number 36, valid or external IP address and port number 38 and destination IP address and port number 40.

Each table entry 39A, 39B, 39C, and 39D represents a possible network connection between addressable network processors for enabling data packet transfers therebetween. In particular, such connection entries each represent selected multiple single-user IP address links which are accessible simultaneously for high-performance data traffic through actual physical modem lines available between WAN-LAN or LAN-LAN computers. For example, in a configuration employing three simultaneous 33 kbps modem connections between two network clusters, overall network throughput could be as high 99 kbps, when all links are multiplexed according to the present invention.

Generally, a loosely-coupled multi-processor network architecture is described herein and configured with an improved IP packet router, which may be embodied or operated in a manner functionally equivalent to one or more "WebRamp" router products developed by Ramp Networks, Inc. located in Santa Clara, Calif., (rampnet.com). It is contemplated, furthermore, that equivalent network routing facility which function in accordance with the present invention may be implemented in alternative server processor or other secondary proxy architectures wherein multiple link mapping or effective multiplexing is achieved, for example, wherein desired source or destination IP addresses, ports, and/or sockets are definable and coupleable selectably at application, packet, or connection level to one or more specific network resources or IP addresses.

Essentially, a routing facility is provided wherein LAN processors selectively couple to multiple single-user Internet access accounts provided by various ISPs. The look-up table 16 implemented in software or firmware essentially provides programmable capability for multiplexing or defining bi-directional network connection assignments between individual LAN users and multiple single-user WAN ISP accounts. More particularly, table 16 provides internal-external translation of IP addresses and port assignments for possibly modifying incoming and outgoing Internet messages during packet routing.

Connection-level multiplexing is achieved essentially by setting desired IP address and port number assignments during incoming or outgoing packet processing between individual LAN users and multiple single-user Internet accounts via available WAN modem linkages. Outbound packets are processed by replacing source IP address and port number with valid IP address and port number. Multiplexing is achieved as multiple valid IP addresses replace source IP address and port assignments. Depending on the new source IP address, a different WAN link is designated. Inbound packets are processed by replacing destination IP address and port number with internal IP address and port number.

Preferably, packet connection and modification are performed by maintaining and checking entries in programmable data structure in storage memory, such as the look-up IP translation table 16. As described herein, network resource allocations are optimizable, for example, such that WAN links are assigned according to predictable criteria, including loading or access fairness, available capacity or bandwith, or other congestion-avoidance scheme.

It is contemplated that the inventive apparatus and methods as claimed herein and described in best-mode detail would advantageously provide LAN users and ISP operators with higher performance and potentially more economical means for Internet access and communication. For ISP servers, such access is manifested through the use of multiple single-user ISP accounts. Networking flexibility and capacity are significantly improved, especially for users desiring to access multiple locations on the Internet via multiple TCP/IP connections.

Simultaneous connections are sometimes preferred during use of browser application software, like Netscape Navigator or Microsoft Internet Explorer, which access various URL sites across the world-wide web, typically allowing for multiple simultaneous Internet connections to download text and graphics information separately. With CLM technique, such transfers can occur in parallel across multiple WAN links.

Figure 3:
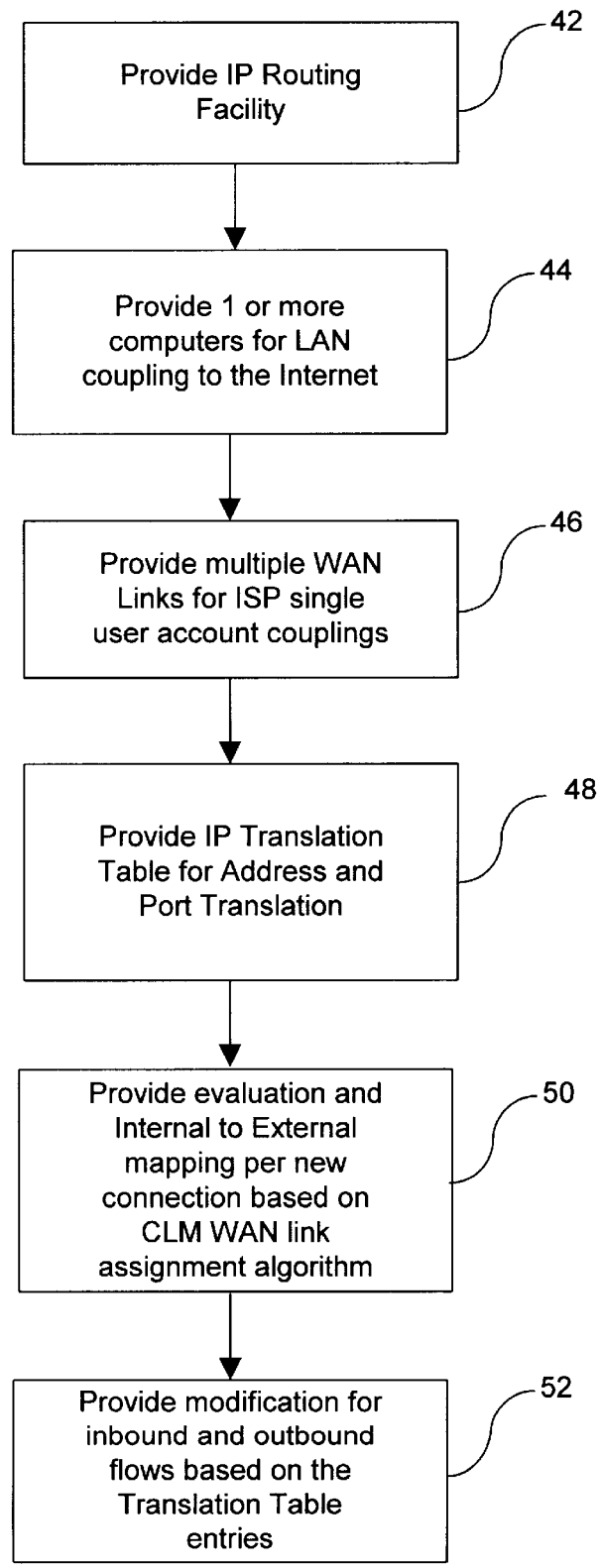
FIG. 3 is a generalized flow chart illustrating the main operational steps associated with computer network configuration and CLM packet processing according to the present invention.

FIG. 3 is a flow chart of network configuration and CLM packet processing. Initially, IP routing and networking facility 10, 12 as described above is provided 42. One or more LAN computers 30 configured for coupling to the Internet 34 are provided 44. Multiple WAN links 26, 28 for ISP single-user account couplings are provided 46. IP translation table 16 is provided 48 for address and port translation. Provided 50 next are packet evaluation and internal-to-external mapping per new connection based on CLM WAN link assignment algorithm. Then, modification for inbound and outbound packet flows is provided 52 based on translation table entries.

Figure 4:
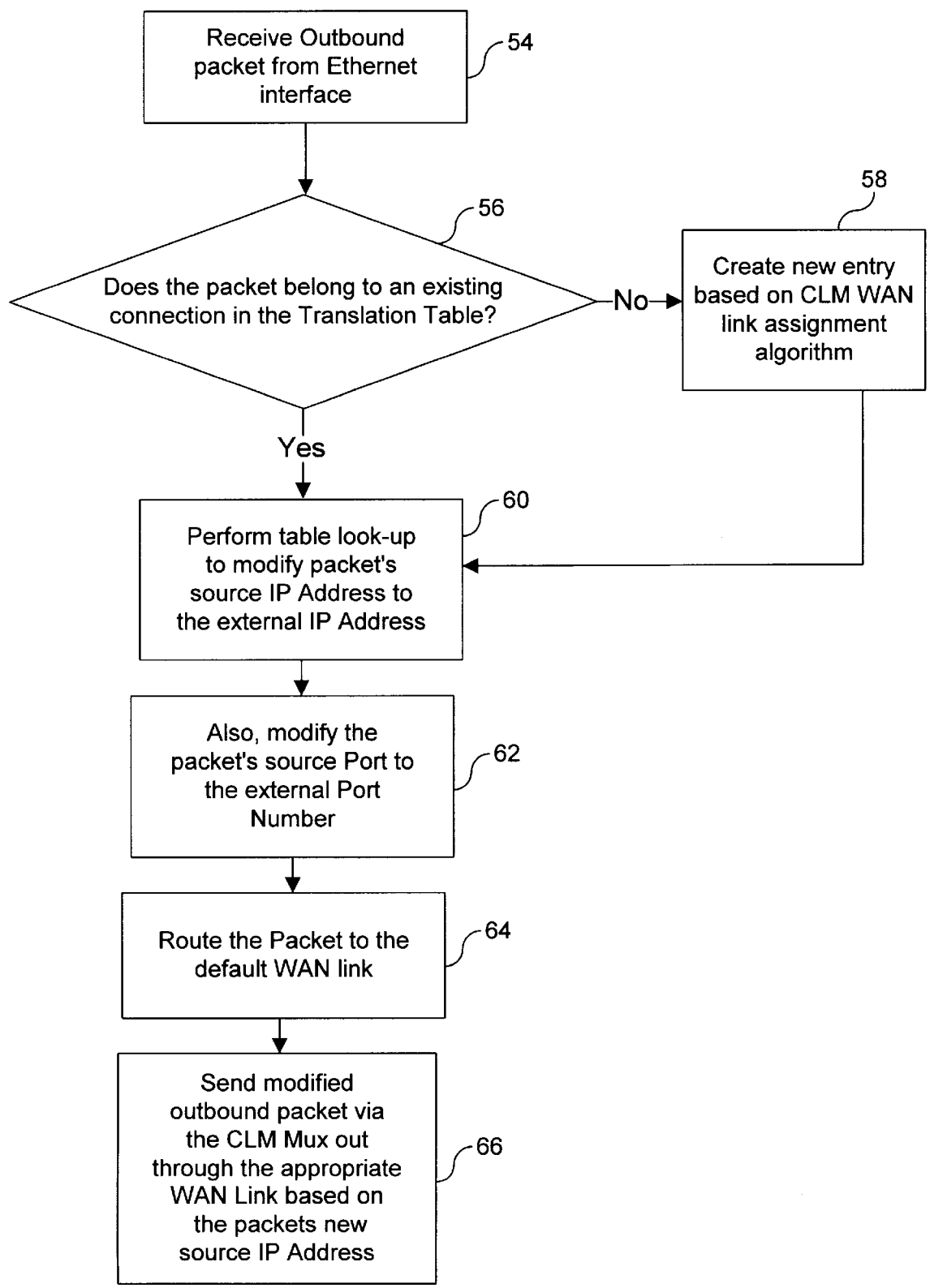
FIG. 4 is a flow chart illustrating the operational steps associated with outgoing packet routing and CLM processing according to the present invention.

FIG. 4 is a flow chart showing outgoing packet routing and CLM processing. Initially, outbound packet is received 54 from LAN PC 30 through Ethernet interface 24. As described above, LAN CLM outgoing handler functional module 14 determines whether the received outbound packet belongs 56 to an existing connection in look-up translation table 16. If not, a new entry is created and added 58 to table 16 based on CLM WAN link assignment algorithm. Otherwise, perform 60 table 16 look-up to modify outgoing packet source IP address to external IP address. Additionally, outgoing packet source port is modified 62 to be replaced with external port number. Outgoing packet, as modified, is routed 64 by IP router 12 to default WAN link 20. Modified outbound packet is then sent 66 via CLM multiplex out through appropriate WAN link based on packet new source IP address.

Figure 5:
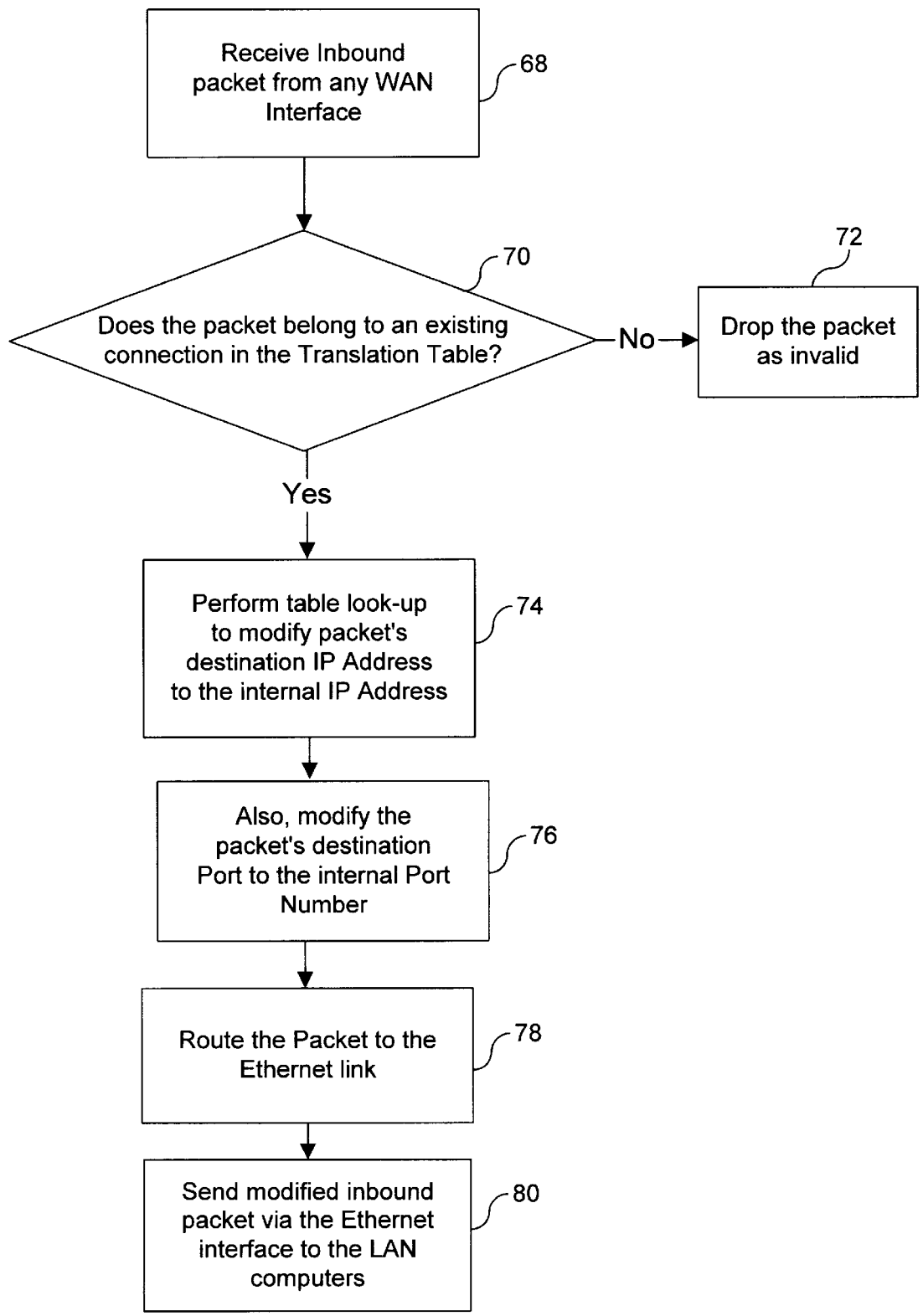
FIG. 5 is a flow chart illustrating the operational steps associated with incoming packet routing and CLM processing according to the present invention.

FIG. 5 is a flow chart showing incoming packet routing and CLM processing. Initially, inbound packet is received 68 from any WAN interface 26. During inbound packet processing, WAN CLM functional module 22 effectively functions as mere packet pass-through. Incoming handler 18 determines 70 whether inbound packet belongs to an existing connection in translation table 16. If inbound packet does not belong, the packet is dropped 72 as invalid. Otherwise, as described above, WAN CLM 22 and incoming handler 18 cause table 16 look-up to be performed 74 to modify incoming packet destination IP address to the internal IP address. Also, incoming packet destination port is modified 76 to internal port number. Modified incoming packet is routed 78 by IP router 12 to Ethernet link 24. Then, send modified inbound packet via Ethernet interface to appropriate LAN computer 30.

In accordance with an alternate embodiment of the present invention, packet-level multiplexing (PLM), which is similar to CLM in an analogous but functionally reverse manner, provides packet transfer through multiple single-user IP address accounts between individual users in different public or private LAN computer clusters. Hence, PLM enables simple, inexpensive IP-to-IP networking. File transfer (e.g., FTP) performance is significantly improved by aggregating multiple modem pair links which share single IP address between office networks.

In particular, during outbound LAN1-LAN2 packet processing, destination IP address and port number are replaced with external IP address and port number. Moreover, during inbound LAN2-LAN1 packet processing, source IP address and port number are replaced with internal IP address and port number. As in the case of CLM packet processing, essentially equivalent network facility 10 like shown in FIG. 1 and described above is applicable for achieving PLM network connection functionality. During PLM packet transmission, it is possible for either LAN to send packets on any link at any time because each of multiple single-user links are designated effectively a common IP address.

Figure 6:
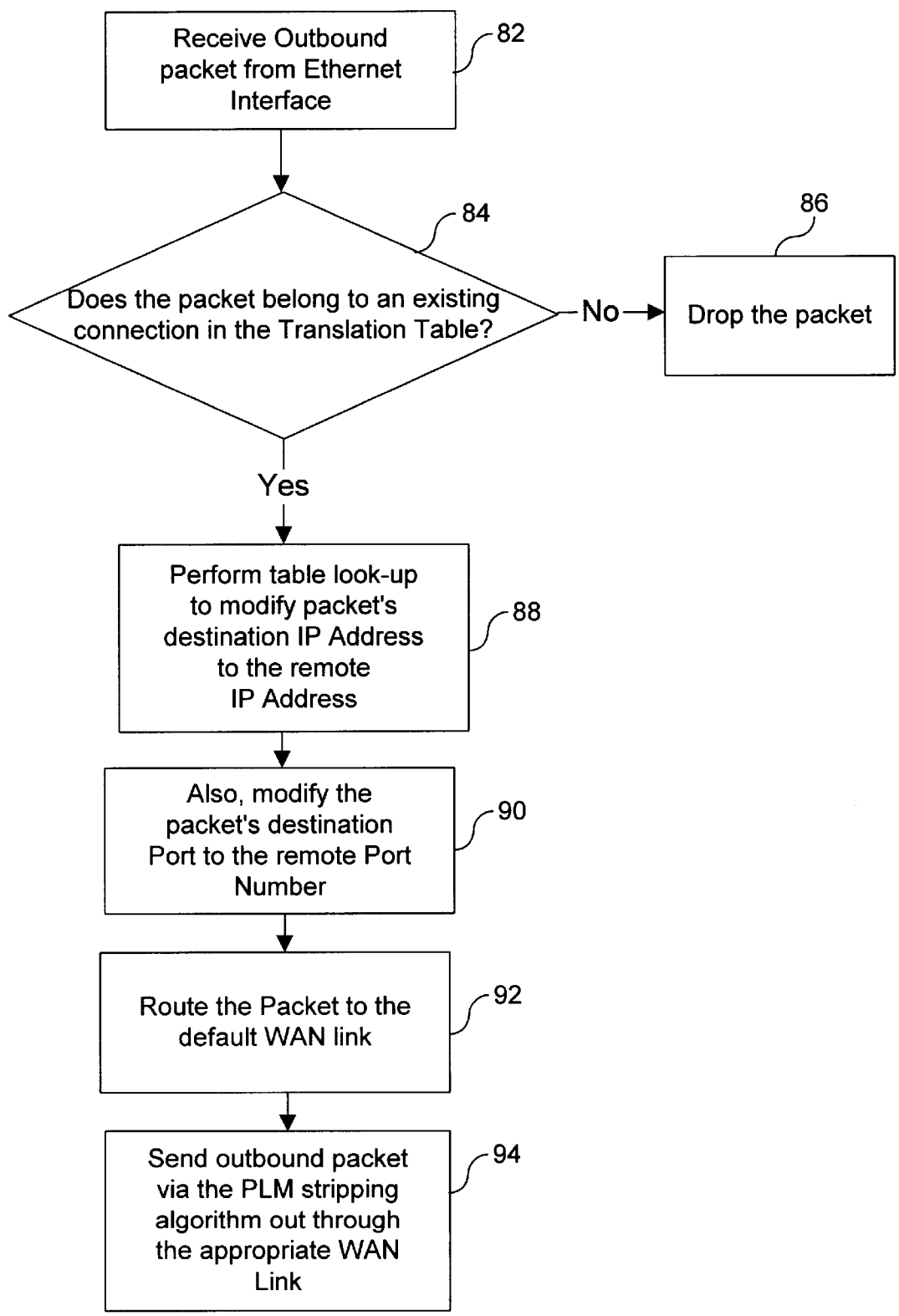
FIG. 6 is a flow chart showing outgoing packet (from master/server to slave/client) routing and PLM processing performed by master/server processor according to the present invention.

FIG. 6 is a flow chart showing outgoing packet (from master/server to slave/client) routing and PLM processing performed equivalently by improved routing facility as described above for CLM processing. Initially, outbound packet is received 82 from Ethernet interface 24 from a processor in a ("master") LANA for transmission to a processor in a ("slave") LANB coupled thereto. Then, it is determined 84 whether the received packet belongs to an existing connection entry in translation table 16. If such outgoing packet is not found as existing connection entry, then the packet is dropped 86. Otherwise, when such packet is determined to belong to an existing connection, then look-up table processing is performed 88 to modify outgoing packet destination IP address to be replaced with desired, remote IP address.

Additionally, outgoing packet destination port is modified 90 to be placed with desired, remote port number. The modified outbound packet is then routed 92 to default WAN link interface 20 based on routing table entry for slave LANB. Finally, outbound packet is sent 94 preferably via PLM stripping algorithm (e.g., round-robin or other load-balancing scheme as described above for CLM for channel selection) through appropriate WAN link. Note that in the PLM case, configuration is required such that the remote (slave) network has route entries in the master route table. Hence, the master WebRamp router device, for example, in its route table would have routes to the remote LAN network.

Figure 7:
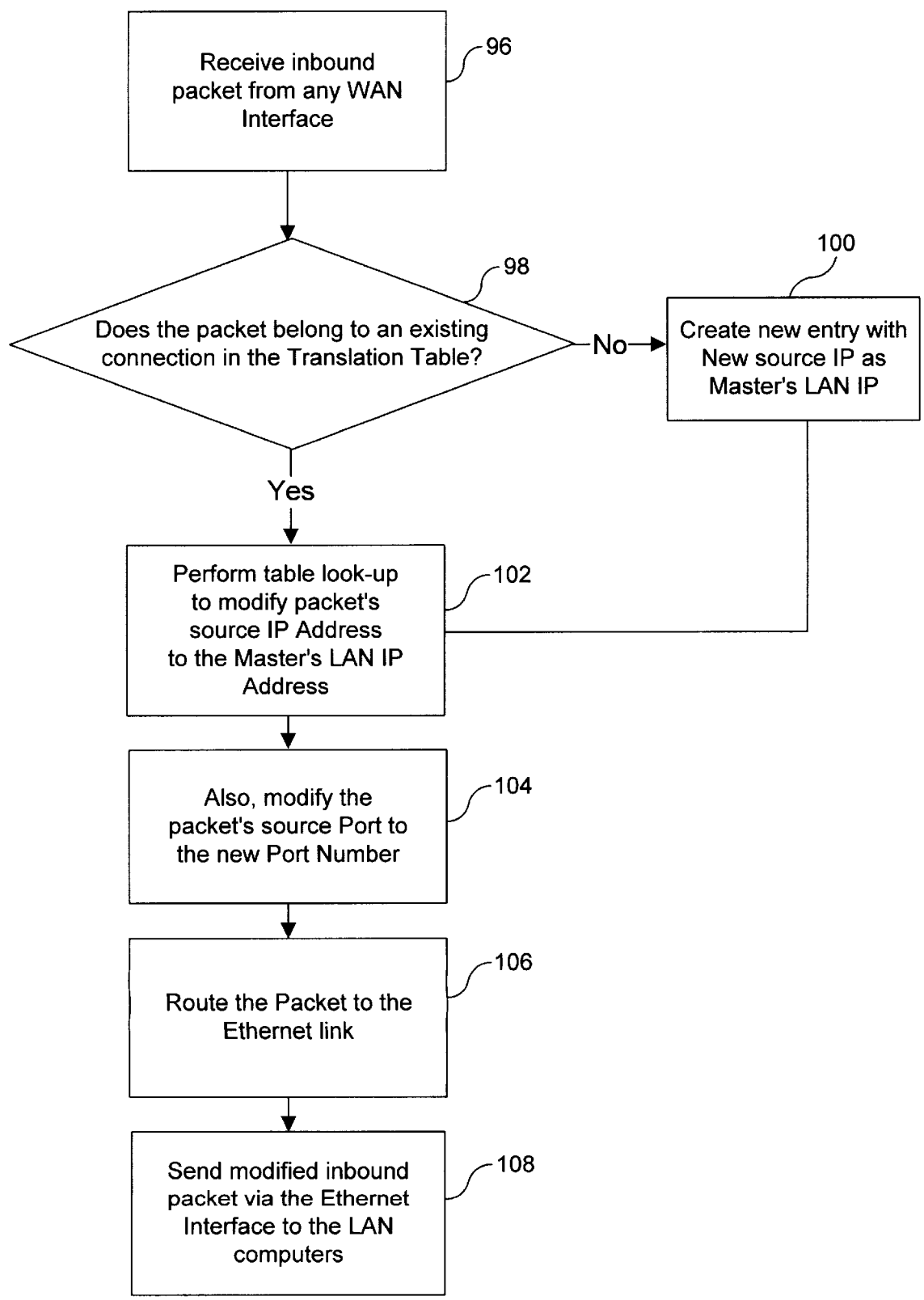
FIG. 7 is a flow chart showing incoming packet (to master/server from slave/client) routing and PLM processing performed by master/server per the present invention.

FIG. 7 is a flow chart showing incoming packet (to master/server from slave/client) routing and PLM processing performed equivalently by improved routing facility as described above for CLM processing. Initially, inbound packet is received 96 from WAN interface 26 from a processor in a ("slave") LAN for transmission to a processor in a ("master") LAN coupled thereto. Then, it is determined 98 whether the received packet belongs to an existing connection entry in translation table 16. If such incoming packet is not found as existing connection entry, then a new entry is created 100 or added in look-up table 16 having new source IP address which is the same as that of master LAN IP address. Otherwise, when such packet is determined to belong to an existing connection, then look-up table processing is performed 102 to modify incoming packet source IP address to be replaced with master LAN IP address.

Here, the master LAN IP address serves effectively as the single external IP address for the entire master-slave-slave LAN configuration, whereas previously in the CLM case, each WAN link was provided its own external IP address. Since each slave LAN processor is provided private IP addresses, still need master-slave address translation for communication therebetween. The present configuration provides simpler and less expensive approach since need less IP address assignment and corresponding network system management.

Additionally, incoming packet source port is modified 104 to be replaced with desired port number. The modified inbound packet is then routed 106 to Ethernet link interface 24. Finally, inbound packet is sent 108 via Ethernet interface to specified LAN computer 30. The default route for the master would be to a host router on the master LAN. Optionally, host router function could be handled by a WebRamp router facility, for example, coupled directly via conventional T1 link to the Internet.

Figure 8:
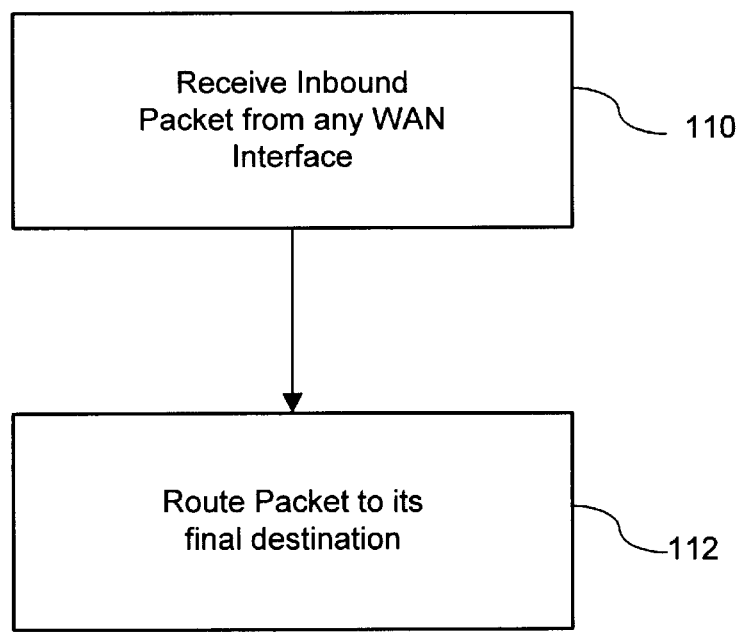
FIG. 8 is a flow chart showing incoming packet (from master/server to slave/client) routing and PLM processing per the present invention.

FIG. 8 is a flow chart showing incoming packet (from master/server to slave/client) routing and PLM processing performed performed equivalently by improved routing facility as described above for CLM processing. As shown, "slave" network routing facility receives 110 inbound packet from WAN interface 26, then received incoming packet is merely routed 112 to final destination.

Figure 9:
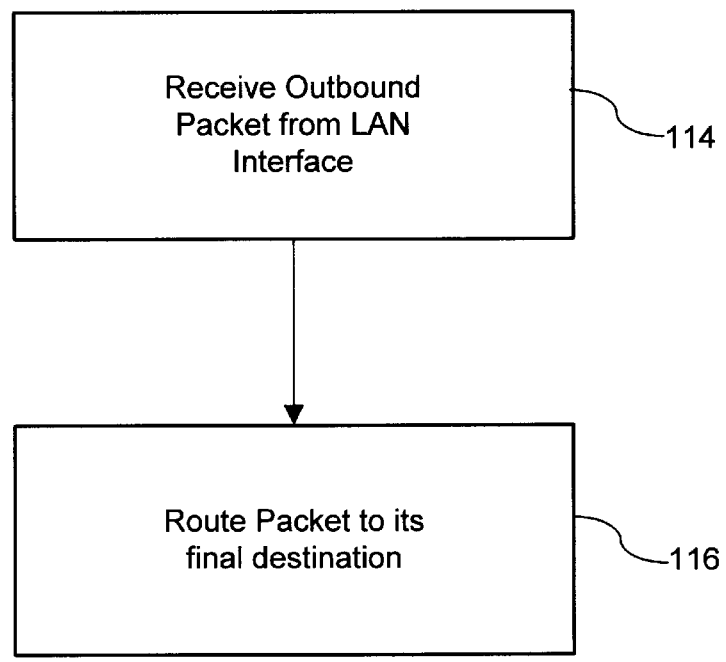
FIG. 9 is a flow chart showing outgoing packet (to master/server from slave/client) routing and PLM processing according to the present invention.

FIG. 9 similarly shows a flow chart showing outgoing packet (to master/server from slave/client) routing and PLM processing performed equivalently by improved routing facility as described above for CLM processing. As shown, "slave" network routing facility receives 114 outbound packet from LAN interface 24, then received outbound packet is merely routed 116 to final destination.

Figure 10:
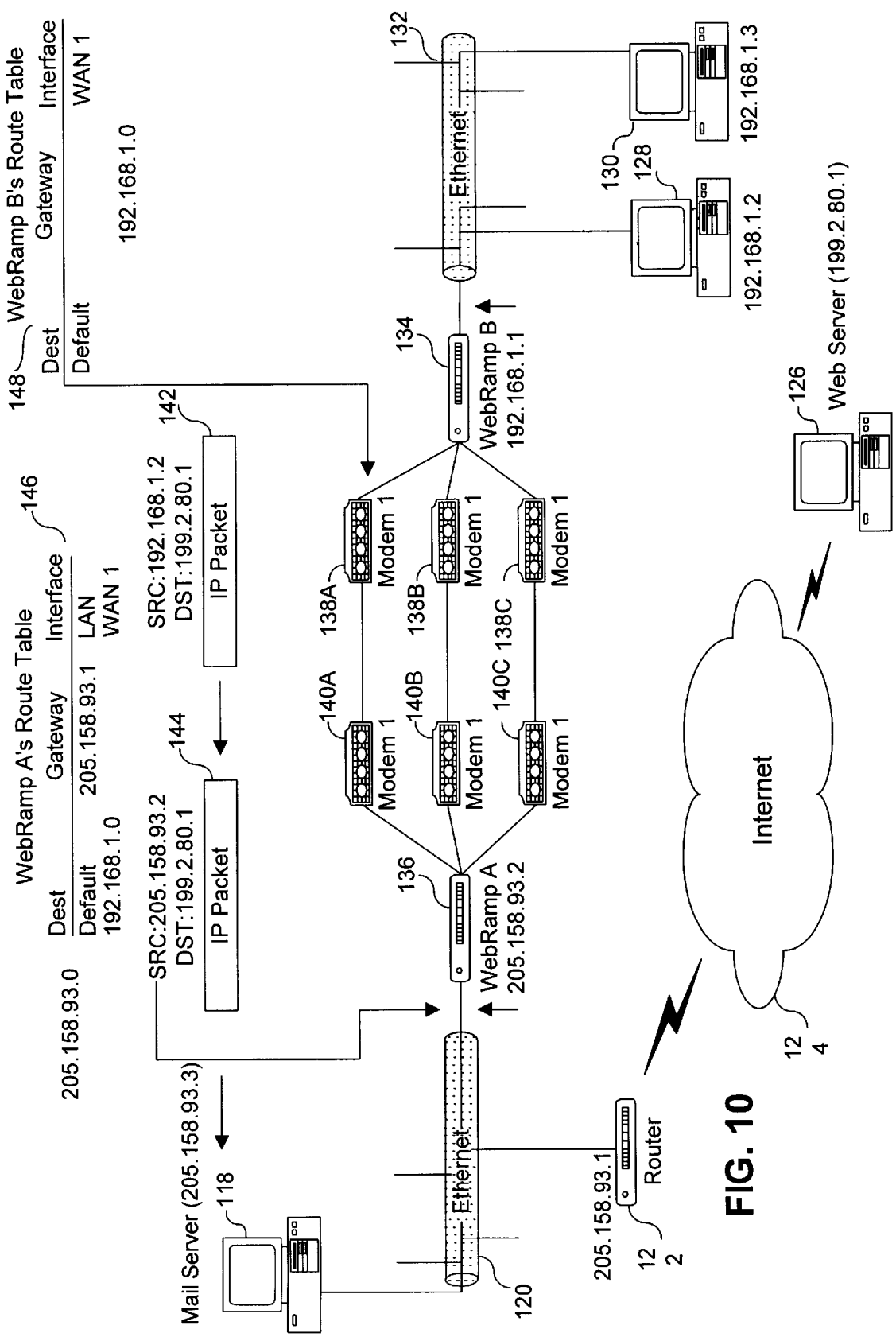
FIG. 10 is a diagram of a representative PLM system configured with private slave/server LAN according to the present invention.

For additional illustration, FIG. 10 shows a diagram of a representative PLM system configured with private slave/server LAN. In this configuration, private slave Ethernet LAN 132, which includes personal computers (IP address 192.168.1.2) 128, (IP address 192.168.1.3) 130, is coupled through routing facility (WebRamp B with IP address 192.168.1.1) 134 over multiple single IP address links through three parallel modem pairs 138A, B, C, 140A, B, C to routing facility (WebRamp A with IP address 205.158.93.2) 136 associated with master Ethernet LAN 120 which includes mail server (IP address 205.158.93.3) 118 and couples through host router (IP address 205.158.93.1) 122 to WAN Internet 124 and then web server (IP address 199.2.80.1) 126.

On the slave LAN side (IP address 192.168.1.0) 132, WebRamp B is provided with route table 148 having default gateway WAN1, which preferably goes initially through modem pair 138A, 140A. Moreover, when a packet is received on the slave side from LAN 120 or WAN 124, no address translation is performed, and the incoming packet is merely routed to destination computer 128, 130. Outbound packet is not translated, just routed as is to default gateway. At WAN CLM 22, packet stripping algorithm, as described above, may be applied to place outgoing packets onto different WAN interfaces (e.g., round robin, etc.)

On the master LAN side (IP address 205.158.93.0) 120, WebRamp A is provided with route table 146 having default gateway of 205.158.93.1 (LAN interface). Note that the slave's WAN link address is 192.168.1.1; and the master has a different WAN link address. Effectively, the master routes to slave network through the network WAN link. When a packet is received on the master side from WAN 124 side, such WAN packets are evaluated by incoming handler 18 which looks up packet in translation table, such that if entry exists, packet address translation is performed wherein source IP address is modified to be LAN IP address of master, and port translation is also performed. When no table entry is indicated, a new connection entry is added using LAN IP address of master as valid external IP address.

Additionally, when packet 142 is received on the master side from LAN 132 side, packet address translation is performed such that destination IP address and port are modified according to look-up table, which is essentially reverse process of CLM process. Outgoing LAN packets are evaluated for existence of an entry in translation table 16. If no entry exists, packet is dropped. Otherwise, if entry exists, destination IP address and port number are changed as specified in table entry.

For the present network configuration, the following representative route table is provided for further illustration:

| Destination: | Gateway: | Local Interface: |
|---|---|---|
| 206.120.1.0 | 192.169.1.1 | WAN1 |
| 192.169.1.1 | 192.170.1.1 | WAN1 |

Moreover, during initial network system configuration, it is contemplated that the following representative IP addresses may be assigned automatically to corresponding modems 140A, B, C (master side) and modems (slave side) 138 A, B, C:

| Modem: | Address: |
|---|---|
| 138A | 192.169.1.1 |
| 138B | 192.169.1.2 |
| 138C | 192.169.1.3 |
| 140A | 192.170.1.1 |
| 140B | 192.170.1.2 |
| 140C | 192.170.1.3 |

What is claimed is:

1. A computer network for digital packet communication comprising:
   a first network having at least one first processor, each first processor having a first address;
   a second network having at least one second processor, each second processor having a second address; and
   a network module for coupling the first network and the second network, the network module comprising an outbound handler, an incoming handler, an IP translation table, an IP router, a plurality of wide area network interfaces connecting to a plurality of corresponding modems to form a plurality of links, wherein the outbound handler checking the IP translation table to select a link for an outbound packet by modifying destination IP address and destination port number of the outbound packet wherein the incoming handler checking the IP translation table for an incoming packet and either dropping the incoming packet if the incoming packet is not found in the IP translation table or modifying destination IP address and destination port number of the incoming packet if the incoming packet is found in the IP translation table.

2. A computer network comprising:
   a local area network having a plurality of processors, each processor having an internal Internet Protocol (IP) address;
   a wide area network having a plurality of Internet Service Providers (ISP); and
   a connection circuit for coupling the local area network and the wide area network, the connection circuit comprising an outbound handler, an incoming handler, an IP translation table, an IP router, a plurality of wide area network interfaces connecting to a plurality of corresponding modems to form a plurality of links, wherein the outbound handler checking the IP translation table to select a link for an outbound packet by modifying destination IP address and destination port number of the outbound packet wherein the incoming handler checking the IP translation table for an incoming packet and either dropping the incoming packet if the incoming packet is not found in the IP translation table or modifying destination IP address and destination port number of the incoming packet if the incoming packet is found in the IP translation table.

3. A method for outbound packet transfer from processors in a local area network to Internet Service Providers in a wide area network, the method comprising the steps of:
   receiving from a plurality of processors in a local area network a plurality of outbound packets;
   checking an IP translation table to determine a link from a plurality of links to route an outbound packet;
   modifying the destination IP address and port number of the outbound packet; and
   sending the modified outbound packet via the selected link to a single-user IP account of an Internet Service Provider in a wide area network.

4. A method for inbound packet transfer from Internet Service Providers in a wide area network processors in a local area network, the method comprising the steps of:
   receiving from a plurality of Internet Service Providers (ISPs) in a wide area network a plurality of inbound packets;
   checking the IP translation table to determine a link from a plurality of links to route an inbound packet;
   modifying each inbound packet by replacing its destination Internet protocol (IP) address and port number respectively with an internal IP address and port number; and
   sending modified inbound packets to at least one processor in a local area network via the selected link to a single-user ISP accounts.

5. Apparatus for connecting local-area networks comprising:
   a router for sending packets over a plurality of single-user links connectable between at least one processor in a first local area network (LAN) and at least one processor in a second LAN; and
   a multiplexing module couples to the router a network module for coupling the first network and the second network, the multiplexing module comprising an outbound handler, an incoming handler, an IP translation table, a plurality of wide area network interfaces connecting to a plurality of corresponding modems to form a plurality of links, wherein the outbound handler checking the IP translation table to select a link for an outbound packet by modifying destination IP address and destination port number of the outbound packet wherein the incoming handler checking the IP translation table for an incoming packet and either dropping the incoming packet if the incoming packet is not found in the IP translation table or modifying destination IP address and destination port number of the incoming packet if the incoming packet is found in the IP translation table.

6. A method for packet processing comprising the steps of:

provding a look-up table in a memory having at least one entry representing a network connection between a first processor in a first network and a second processor in a second network, each entry comprising a source Internet protocol (IP) address and port, a valid IP address and port, and a destination address IP address and port;

receiving a plurality of packets for routing between the first network and the second network;

checking an IP translation table to determine a link from a plurality of links to route an outbound packet; and updating the look-up table to include updated entries corresponding to the received packets, the updated entries representing connections between the first and second networks through a plurality of single-user links provided therebetween, wherein the connections programmably provide multiplexed access simultaneously between one or more processors in the first network and one or more processors in the second network using a plurality of single-user Internet accounts, each single-user Internet account corresponding separately with a different single-user link, whereby a plurality of users in the first network may access the second network simultaneously, the first network having a limited number of IP addresses, and the number of users accessing the limited number of IP addresses is larger than the number of available IP addresses.

7. A method for outbound packet transfer between local area networks, the method comprising the steps of:

receiving at least one outbound packet for transfer from at least one first processor in a first local area network (LAN) to at least one second processor in a second LAN through a plurality of single-user links provided selectably for separately multiplexed access over different single-user links coupled simultaneously therebetween;

checking an IP translation table to determine a link from a plurality of links to route an outbound packet;

modifying the received outbound packet by replacing its destination Internet protocol (IP) address and port number respectively with a remote IP address and port number corresponding to a second processor in the second LAN; and sending the modified outbound packet to the corresponding second processor in the second LAN, whereby a plurality of users in the first LAN may access the second LAN simultaneously, the first LAN having a limited number of IP addresses, and the number of users accessing the limited number of IP addresses is larger than the number of available IP addresses.

8. A method for inbound packet transfer between local area networks, the method comprising the step of:

receiving at least one inbound packet for transfer from at least one first processor in a first local area network (LAN) to at least one second processor in a second LAN through a plurality of single-user links provided selectably for separately multiplexed access over different single-user links coupled simultaneously therebetween;

checking an IP translation table to determine a link from a plurality of links to route an outbound packet;

modifying the received inbound packet by replacing its source Internet protocol (IP) address and port number respectively with an internal IP address and port number corresponding to a second processor in the second LAN; and sending the modified inbound packet to the corresponding second processor in the second LAN, whereby a plurality of users in the first LAN may access the second LAN simultaneously, the first LAN having a limited number of IP addresses, and the number of users accessing the limited number of IP addresses is larger than the number of available IP addresses.

9. The computer network of claim 2 wherein:

said translating means modifies a source IP address to be a provided external IP address.

10. The method of claim 3 wherein:

a source IP address and port number are replaced by a valid IP address and port number which are obtained from a look-up table.

11. The method of claim 3 wherein:

one or more of the outbound packets correspond with a network access instruction for browsing an Internet website over a plurality of Internet user accounts.

12. The method of claim 4 wherein:

one or more of the received inbound packets comprise a response from a browser request to access a network source for downloading data, the response being received over the same link over which the browser request was sent.

13. The method of claim 4 wherein:

the internal IP address and port number are obtained from a digital memory which stores a plurality of IP addresses and port numbers, thereby effectively enabling multiplexed access simultaneously between one or more processors in the local area network over multiple separate single-user links and one or more ISPs in the wide area network.

14. The apparatus of claim 5 wherein:

the multiplexing module comprises a look-up table for storing one or more Internet Protocol (IP) addresses for programmably modifying one or more routing addresses associated with sending packets from the router separately through a first and second single-user links.

* * * * *